US008410208B2

(12) United States Patent
Fujimoto et al.

(10) Patent No.: US 8,410,208 B2

(45) Date of Patent: Apr. 2, 2013

(54) POLYBUTYLENE NAPHTHALATE-BASED RESIN COMPOSITION AND ELECTRIC CABLE USING POLYBUTYLENE NAPHTHALATE-BASED RESIN COMPOSITION

(75) Inventors: Kenichiro Fujimoto, Hitachi (JP); Tomiya Abe, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 553 days.

(21) Appl. No.: 12/579,794

(22) Filed: Oct. 15, 2009

(65) Prior Publication Data

US 2010/0101824 A1 Apr. 29, 2010

(30) Foreign Application Priority Data

Oct. 23, 2008 (JP) ................................ 2008-273131

(51) Int. Cl.
*C08K 3/34* (2006.01)

(52) U.S. Cl. ......................... 524/445; 523/218; 524/195

(58) Field of Classification Search .................. 524/195, 524/445; 523/218
See application file for complete search history.

(56) References Cited

U.S. PATENT DOCUMENTS 6,608,256 B2 * 8/2003 Suzuki et al. .............. 174/117 F
2003/0024729 A1 2/2003 Suzuki et al.
2005/0266243 A1 12/2005 Fukuda et al.

FOREIGN PATENT DOCUMENTS

| | | | |
|---|---|---|---|
| CN | 1389877 | A | 1/2003 |
| JP | 2002-249654 | A | 9/2002 |
| JP | 2002-358837 | A | 12/2002 |
| JP | 2004-193117 | A | 7/2004 |
| JP | 2005-213441 | A | 8/2005 |
| JP | 2005-281465 | A | 10/2005 |
| JP | 2006-111655 | A | 4/2006 |
| JP | 2006-111873 | A | 4/2006 |
| JP | 2006-152122 | A | 6/2006 |
| JP | 2007-045952 | A | 2/2007 |
| JP | 2008-214558 | A | 9/2008 |

OTHER PUBLICATIONS

Liu Bo et al., Thermal Stability and Flame Retardance of Polymer/Clay Nanocomposite, Plastics Sci. & Technology, Aug. 2005, pp. 54-58.

* cited by examiner

*Primary Examiner* — Edward Cain
(74) *Attorney, Agent, or Firm* — Foley & Lardner LLP

(57) ABSTRACT

A polybutylene naphthalate-based resin composition contains, relative to (A) 100 parts by wt of polybutylene naphthalate resin, (B) 40-150 parts by wt of polyester block copolymer, (C) 0.5-5 parts by wt of hydrolysis retarder, and (D) 0.5-5 parts by wt of inorganic multiporous filler.

7 Claims, 1 Drawing Sheet

POLYBUTYLENE NAPHTHALATE-BASED RESIN COMPOSITION AND ELECTRIC CABLE USING POLYBUTYLENE NAPHTHALATE-BASED RESIN COMPOSITION

The present application is based on Japanese patent application No. 2008-273131 filed on Oct. 23, 2008, the entire contents of which are incorporated herein by reference.

BACKGROUND OF THE INVENTION

1. Field of the Invention

The present invention relates to a polybutylene naphthalate-based resin composition used as insulating material. In particular, it relates to a polybutylene naphthalate-based resin composition with excellent heat resistance, flame retardancy, abrasion resistance, and hydrolysis resistance, and an electric cable using the polybutylene naphthalate-based resin composition.

2. Description of the Related Art

Conventionally, polyvinyl chloride resin (PVC) is used as typical electrical insulating material. This PVC insulating material is excellent in having high utility and being inexpensive, but its waste disposal causes environmental pollution, e.g., its incineration after disposal produces chlorine-containing gas. Accordingly, in recent years, there is a demand for insulating material other than PVC.

Also, in transportation fields such as vehicles, trains, etc., with reducing vehicle body weight and saving wiring space for energy saving, there are demands for reduction in weight and thickness of electric cables.

Applying the conventional PVC material for reduction in weight and thickness of electric cables fails to achieve flame retardancy or abrasion resistance required.

On the other hand, among polyester resins which are engineering plastic polymers, polybutylene terephthalate (PBT) is a crystalline polymer, and is excellent in heat resistance, mechanical strength, gas barrier, chemical resistance, abrasion resistance, low solubility, and moldability, and is therefore used in vehicle fuel tubes, liquid crystal glass abrader members, semiconductor-related members, etc. (see JP-A-2005-281465, JP-A-2006-152122, and JP-A-2007-45952 listed below).

Because of having the above features, these engineering plastics are expected to be able to achieve reduction in weight and thickness of electric cables.

Refer to JP-A-2005-281465, JP-A-2006-152122, JP-A-2007-45952, JP-A-2006-111655, JP-A-2006-111873, JP-A-2005-213441, JP-A-2004-193117, and JP-A-2002-358837, for example.

However, the polyester resins, which are a crystalline polymer, have the problem of variation in crystallinity in a producing process or under a specified environment. In particular, heat treatment causes the crystallization to progress, and there is therefore a fear that the tensile elongation property, which is important to insulating material for electric cables, will deteriorate.

JP-A-2006-111655 and JP-A-2006-111873 listed above report that heat treatment or crystallization accelerant addition enhances crystallinity to enhance mechanical strength, high-speed moldability and productivity. However, accelerating crystallization is thought to cause deterioration of the elongation property.

Also, JP-A-2005-213441 listed above discloses that crystallization progression can be retarded by introducing a flexible monomer as polyester-resin raw material, but it does not disclose any elongation property. Further, JP-A-2004-193117 finds out that adding to a polyester resin a resin containing a functional group to react with polyester-based resins inhibits crazing and inhibits a decrease in insulation breakdown voltage and allows excellent high-temperature insulation property, but it does not mention any elongation property with heat treatment of electric cable insulating material.

Further, JP-A-2002-358837 listed above suggests a polyester resin composition for flat cables and sheathes, which contains a thermoplastic aromatic polyester, a specified polyester block copolymer, an olefin-acrylic ester copolymer modified with a glycidyl compound, and optionally a phosphorus-based flame retardant. However, although the phosphorus-based flame retardant used in the polyester resin composition is non-halogen, the polyester resin composition is not suitable for market demands for non-phosphorus-based flame retardants.

SUMMARY OF THE INVENTION

Accordingly, it is an object of the present invention to provide a polybutylene naphthalate-based resin composition, containing no halogen compound, and having heat resistance, flame retardancy, hydrolysis resistance, and abrasion resistance, and an electric cable using the polybutylene naphthalate-based resin composition.

(1) According to one embodiment of the invention, a polybutylene naphthalate-based resin composition comprises:

relative to (A) 100 parts by wt of polybutylene naphthalate resin, (B) 40-150 parts by wt of polyester block copolymer;

(C) 0.5-5 parts by wt of hydrolysis retarder; and (D) 0.5-5 parts by wt of inorganic multiporous filler.

In one embodiment, the following modifications and changes can be made.

(i) The polyester block copolymer (B) comprises 20-70 mass % of hard segment containing not less than 60 mol % of polybutylene terephthalate in dicarboxylic acid components as its main terephthalic acid component, and 80-30 mass % of soft segment formed of a polyester containing 99-90 mol % of aromatic dicarboxylic acid, 1-10 mol % of carbon number 6-12 straight chain aliphatic dicarboxylic acid, and a carbon number 6-12 straight chain diol, and the melting point (T) of the polyester block copolymer is in the following range:

$$TO-5>T>TO-60 \quad (1)$$

where TO is the melting point of the polymer comprising the components constituting the hard segment.

(ii) The hydrolysis retarder (C) is an additive comprising a carbodiimide skeleton.

(iii) The inorganic multiporous filler (D) comprises a calcined clay.

(2) According to another embodiment of the invention, an electric cable using a polybutylene naphthalate-based resin composition comprises the polybutylene naphthalate-based resin composition used as an insulating material, the polybutylene naphthalate-based resin composition comprising, relative to (A) 100 parts by wt of polybutylene naphthalate resin, (B) 40-150 parts by wt of polyester block copolymer; (C) 0.5-5 parts by wt of hydrolysis retarder; and (D) 0.5-5 parts by wt of inorganic multiporous filler.

In another embodiment, the following modifications and changes can be made.

(i) The polyester block copolymer (B) comprises 20-70 mass % of hard segment containing not less than 60 mol % of polybutylene terephthalate in dicarboxylic acid components as its main terephthalic acid component, and 80-30 mass % of soft segment formed of a polyester containing 99-90 mol % of aromatic dicarboxylic acid, 1-10 mol % of carbon number 6-12 straight chain aliphatic dicarboxylic acid, and a carbon number 6-12 straight chain diol, and the melting point (T) of the polyester block copolymer is in the following range:

$$TO-5>T>TO-60 \quad (1)$$

where TO is the melting point of the polymer comprising the components constituting the hard segment.

(ii) The hydrolysis retarder (C) is an additive comprising a carbodiimide skeleton.

(iii) The inorganic multiporous filler (D) comprises a calcined clay.

(iv) The insulating material formed of the polybutylene naphthalate-based resin composition is 0.1-0.5 mm thick.

POINTS OF THE INVENTION

According to one embodiment of the invention, the polybutylene naphthalate-based resin composition comprises (B) 40-150 parts by wt of polyester block copolymer; (C) 0.5-5 parts by wt of hydrolysis retarder; and (D) 0.5-5 parts by wt of inorganic multiporous filler. By thus setting the polyester block copolymer content, the polybutylene naphthalate-based resin composition can have good elongation properties after heat treatment, flame retardancy, and abrasion resistance, and by thus setting the hydrolysis retarder and inorganic multiporous filler content, the polybutylene naphthalate-based resin composition can have good hydrolysis resistance, and insulation resistance.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Figure 1:
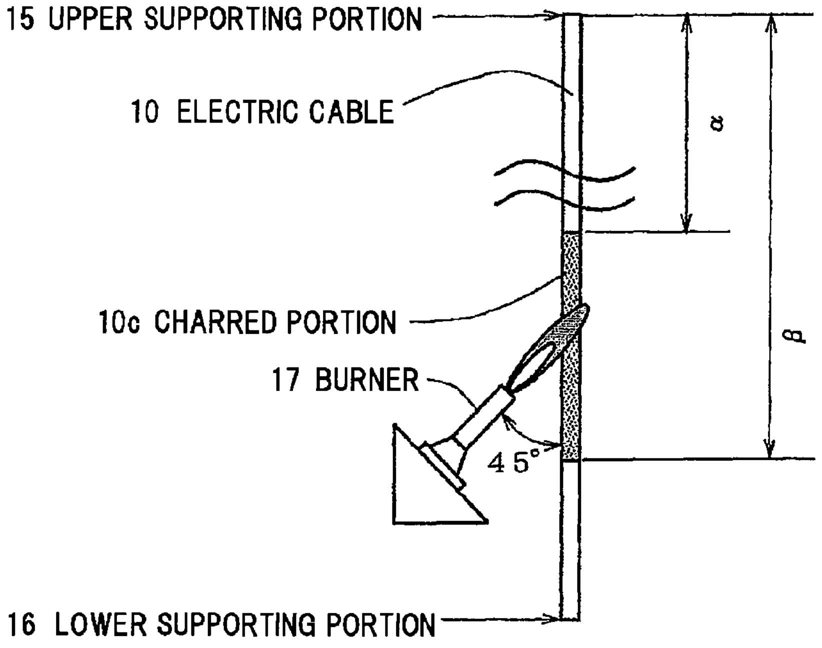
FIG. 1 is an explanatory diagram showing an IEC flame testing method for an electric cable according to the invention.

Below is described one preferred embodiment according to the invention in detail.

A polybutylene naphthalate-based resin composition according to the invention comprises, relative to (A) 100 parts by wt of polybutylene naphthalate resin (PBN), (B) 40-150 parts by wt of polyester block copolymer, (C) 0.5-5 parts by wt of hydrolysis retarder, and (D) 0.5-5 parts by wt of inorganic multiporous filler (calcined clay).

Here, each component (A)-(D) is explained.

(A) Polybutylene Naphthalate Resin (PBN)

The PBN in the invention is a polyester which contains a naphthalene dicarboxylic acid, preferably naphthalene-2,6-dicarboxylic acid as a main acid component, and a 1,4-buthane diol as a main glycolic component, i.e., a polyester in which all or most (typically not less than 90 mol %, preferably not less than 95 mol %) of the repeat unit is a butylene naphthalate dicarboxylate.

Also, this polyester may be a copolymer of the following components in ranges of not damaging physical properties. As acid components, there are an aromatic dicarboxylic acid other than the naphthalene dicarboxylic acid, e.g., phthalic acid, isophthalic acid, terephthalic acid, diphenyldicarboxylic acid, diphenylether dicarboxylic acid, diphenoxy ethane dicarboxylic acid, diphenyl methane dicarboxylic acid, diphenyl ketone dicarboxylic acid, diphenyl sulfide dicarboxylic acid, diphenyl sulfone dicarboxylic acid, an aliphatic dicarboxylic acid, e.g., succinic acid, adipic acid, sebacic acid, an alicyclic dicarboxylic acid, e.g., cyclohexane dicarboxylic acid, tetralin dicarboxylic acid, decalin dicarboxylic acid, etc.

As glycolic components, there are ethylene glycol, propylene glycol, trimethylene glycol, pentamethylene glycol, hexamethylene glycol, octamethylene glycol, neopentyl glycol, cyclohexane dimethanol, xylylene glycol, diethylene glycol, polyethylene glycol, bisphenol A, catechol, resorcinol, hydroquinone, dihydroxy diphenyl, dihydroxydiphenyl ether, dihydroxydiphenyl methane, dihydroxydiphenyl ketone, dihydroxydiphenyl sulfide, dihydroxydiphenyl sulfone, etc.

As oxycarboxylic acid components, there are oxybenzoic acid, hydroxynaphthoic acid, diphenyl carboxylic acid, ω-hydroxycaproic acid, etc.

The polyester may be copolymerized with 3 or more functional groups, such as glycerin, trimethylpropane, pentaerythritol, trimellitic acid and pyromellitic acid, in a range of substantially not losing moldability.

Such a polyester is produced by polycondensing naphthalenedicarboxylic acid and/or its functional derivative and butylene glycol and/or its functional derivative using a conventional known method for producing aromatic polyesters.

The concentration of the terminal carboxyl groups of PBN used in the present invention is not specially limited, but is desirably low.

(B) Polyester Block Copolymer

The polyester block copolymer (B) used in the present invention comprises a hard segment containing not less than 60 mol % of polybutylene terephthalate as its main constituent, but may also be copolymerized with a benzene or naphthalene ring-containing aromatic dicarboxylic acid other than terephthalic acid, a carbon number 4-12 aliphatic dicarboxylic acid, and a diol such as a carbon number 2-12 aliphatic diol other than tetramethylene glycol, and an alicyclic diol such as a cyclohexane dimethanol. This copolymerization proportion is less than 30 mol %, preferably less than 10 mol % in all the dicarboxylic acids. The smaller this copolymerization proportion, the higher the melting point. The smaller copolymerization proportion is preferred, but the copolymerization is performed for flexibility increasing. However, there is a fear that a large copolymerization proportion will cause a decease in the compatibility of the polyester block copolymer (B) and polybutylene naphthalate resin (A), therefore damaging abrasion resistance, which is the problem to be solved by the present invention.

On the other hand, the polyester block copolymer (B) used in the present invention also comprises a soft segment formed of a polyester containing 99-90 mol % of aromatic dicarboxylic acid, 1-10 mol % A) of carbon number 6-12 straight chain aliphatic dicarboxylic acid, and a carbon number 6-12 straight chain diol.

As the aromatic dicarboxylic acid, there are terephthalic acid and isophthalic acid.

As the straight chain aliphatic dicarboxylic acid, there are adipic acid and sebacic acid. The amount of the straight chain aliphatic dicarboxylic acid is 1-10 mol %, preferably 2-5 mol % in all the acid components of the polyester forming the soft segment. More than 10 mol % of straight chain aliphatic dicarboxylic acid causes a decease in the compatibility with polybutylene naphthalate resin (A), and therefore in abrasion resistance.

On the other hand, less than 1 mol % A) of straight chain aliphatic dicarboxylic acid damages the flexibility of the soft segment, and therefore the softness of the polyester resin composition.

As the diol, there is carbon number 6-12 straight chain diol.

The polyester forming the soft segment is required to be non- or low-crystalline. In view of this, it is necessary to use not less than 20 mol % of isophthalic acid of all the acid components constituting the soft segment. Also, the soft segment may be copolymerized with some other components similarly to the hard segment. However, the copolymerization component amount is not more than 10 mol %, preferably not more than 5 mol % because of preventing a decease in the compatibility with the polybutylene naphthalate resin (A), and therefore damage in abrasion resistance, which is the problem to be solved by the present invention.

In the polyester block copolymer of the invention, the mixing ratio of the hard and soft segments may be preferably 20-70 mass % of hard segment and 80-30 mass % of soft segment. Also, its mass ratio is 20-50 to 80-50, preferably 25-40 to 75-60. The reason for these mass ratios is because the hard segment more than this adversely makes the polyester block copolymer produced hard and difficult to use, while the more soft segment makes the crystallinity small, and the polyester block copolymer produced difficult to handle.

Also, the segment lengths of the soft and hard segments of the polyester block copolymer are about 500-7000, preferably 800-5000 in molecular weight, but are not specially limited thereto. This segment length is difficult to directly measure, but can, using Flory's formula, be estimated from polyester compositions constituting the hard and soft segments respectively, and the melting point of the polyester comprising the components constituting the hard segment and the melting point of the polyester block copolymer obtained.

From this point of view, the melting point (T) of the polyester block copolymer of the invention is important, and is preferably in the following range:

$$TO-5>T>TO-60 \quad (1)$$

where TO is the melting point of the polymer comprising the components constituting the hard segment.

Namely, the melting point (T) is between TO-5 and TO-60, preferably between TO-10 and TO-50, more preferably between TO-15 and TO-40. Also, this melting point (T) is 10° C., preferably 20° C. or higher than the melting point (T') of a random copolymer, and 150° C., preferably 160° C. or higher when the melting point (T') of the random copolymer is not determined.

If the polymer of the invention is not a block copolymer but a random copolymer, this polymer is generally non-crystalline, and low in glass transition temperature, and is therefore in a starch syrup form, significantly deteriorates in moldability, and is sticky. In practice, the random copolymer cannot be used.

As a method for producing such a polyester block copolymer, there is a method by producing polymers forming the soft and hard segments respectively, melting and mixing them so that the melting point of the polyester block copolymer is lower than the melting point of the polyester forming the hard segment. Because this melting point is varied according to mixing temperatures and time, it is preferred to add a catalyst deactivator such as phosphorus oxyacid for catalyst deactivation at an intended melting point.

The polyester block copolymer of the invention is not less than 0.6, preferably 0.8-1.5 in intrinsic viscosity measured in 35° C. orthochlorophenol. This is because the intrinsic viscosity lower than 0.6 adversely lowers the strength of the polyester block copolymer.

(C) Hydrolysis Retarder

The hydrolysis retarder (C) used in the present invention is a compound with a carbodiimide skeleton, but is not specially limited thereto.

Its additive amount is 0.5-5 parts by wt, preferably 1-3 parts by wt relative to the polybutylene naphthalate-based resin composition. Less than 0.5 parts by wt allows no sufficient durability of the invention, while more than 0.5 parts by wt allows no flexibility of an electric cable when applied, and also causes the polybutylene naphthalate-based resin composition to move onto the electric cable surface, leading to poor appearance thereof.

(D) Inorganic Multiporous Filler (Calcined Clay)

The inorganic multiporous filler (D) used in the present invention is preferably a calcined clay, and its specific surface area is preferably not less than 5 $m^2/g$.

Its additive amount is preferably 0.5-5 parts by wt, more preferably 1-3 parts by wt relative to the polybutylene naphthalate-based resin composition. Too small the content thereof allows no sufficient ion trapping, therefore making the insulation resistance small. On the other hand, too large the content adversely lowers the dispersive or tensile properties.

Also, the inorganic multiporous filler may, instead of being a calcined clay, be a zeolite, mesalite, anthracite, perlite foam, or activated carbon.

(E) Others

Each above-described component may be combined in the polybutylene naphthalate resin with a known means in any stage prior to sheath production. The most convenient method uses pelleting by melting, mixing and extruding of the polybutylene naphthalate resin, polyester-polyester elastomer, hydrolysis retarder, calcined clay, etc.

Also, the resin composition of the invention may be combined and blended with a pigment, dye, filler, nucleating agent, release agent, antioxidant, stabilizer, antistatic agent, lubricant, and other known additives.

The polybutylene naphthalate-based resin composition of the invention may be combined with a thermoplastic resin other than the polybutylene naphthalate resin, in a range of not damaging the effect of the invention. For example, there are polyester resin, polypropylene resin, and polyethylene resin, such as polyethylene terephthalate, polybutylene terephthalate, and polytrimethylene terephthalate.

EXAMPLES

The invention is explained in details by way of Examples and Comparative examples below, but not limited to these Examples only.

Table 1 shows Examples 1-5 and Comparative examples 1-7 evaluated with the polybutylene naphthalate alloy composition and its combination composition examined in the present invention.

TABLE 1

(Combination part by wt.)

| | | Example | | | | | Comparative example | | | | | | |
|---|---|---|---|---|---|---|---|---|---|---|---|---|---|
| | | 1 | 2 | 3 | 4 | 5 | 1 | 2 | 3 | 4 | 5 | 6 | 7 |
| Combination composition | PBN | 100 | 100 | 100 | 100 | 100 | 100 | 100 | 100 | 100 | 100 | 100 | 100 |
| | Polyester block copolymer | 67 | 67 | 100 | 100 | 150 | — | 25 | 25 | 25 | 30 | 160 | 233 |
| | Hyodrolysis retarder | 3 | 3 | 3 | 1 | 3 | — | — | 10 | — | 1 | 1 | — |
| | Calcined clay | 1 | 2 | 2 | 2 | 2 | — | — | — | 2 | 1 | 1 | — |
| Evaluation | Hydrolysis resistance | Good | Good | Good | Good | Good | Poor | Poor | Defects in electric cable appearance | Poor | Good | Good | Poor |
| | Flame retardancy | Good | Good | Good | Good | Good | Poor | Poor | | Poor | Poor | Good | Good |
| | Elongation (%) after heat treatment | Good | Good | Good | Good | Good | Poor | Poor | | Poor | Poor | Good | Good |
| | Insulation resistance (MΩ · km) | Good | Good | Good | Good | Good | Poor | Poor | | Good | Good | Good | Poor |
| | Abrasion property | Good | Good | Good | Good | Good | Good | Good | | Poor | Good | Poor | Poor |
| | Pass or Fail | Pass | Pass | Pass | Pass | Pass | Fail | Fail | | Fail | Fail | Fail | Fail |

PBN: TQB-OT from TEIJIN CHEMICALS LTD.
Polyester block copolymer: Nouvelan ® TRB-EL2 (Melting point 210° C.) from TEIJIN CHEMICALS LTD.
Hydrolysis inhibitor: CARBODILITE ® HMV-8CA from Nisshinbo Holdings Inc.
Calcined clay: SP-33 from Engelhard Corporation
Insulator sheath thickness: 0.3 mm With the combination composition in Table 1, electric cable production is as follows.

A produced polybutylene naphthalate-based resin composition is dried at 130° C. for 8 hours in a hot-air thermostat bath, extruded and molded into a 0.3 mm-thick sheath around a 1.4 mm-diameter tin-plated soft copper wire. The extruding and molding uses a 4.2 mm-diameter dice and a 2.0 mm-diameter nipple. The extruding temperature is 240° C.-260° C. in cylinder portion, and 260° C. in head portion. The pulling velocity is 5 m/min.

The evaluation in Table 1 is as follows.

Hydrolysis Resistance Test

Produced electric cable samples from which is removed its core are left unattended in a 85° C./85% RH thermo-humidistat bath for 30 days. This is followed by tension testing. A tensile elongation of not less than 200% is denoted by "Good," a practical level but a tensile elongation of not less than 100% and less than 200% is denoted by "Fair," and a tensile elongation of less than 100% is denoted by "Poor."

Flame Retardancy

The flame retardancy of electric cables is tested by burning. Produced electric cables are tested, conforming to the IEC flame test (IEC 60332-1). Referring to FIG. 1, electric cable 10 is held vertically by upper and lower supports 15 and 16, and burner 17-flamed at a position of 475±5 mm from the upper support 15, and at an angle of 45° and for a prescribed burning time. Subsequently, the burner 17 is removed and turned off. Charred portion 10*c* is examined.

An upper support 15 to charred portion 10*c* distance of not less than 50 mm in electric cable upper portion (a) and not more than 540 mm in electric cable lower portion (β) is denoted by "Good," and an upper support 15 to charred portion 10*c* distance outside that range is denoted by "Poor."

Elongation after Heat Treatment

An elongation after heat treatment is evaluated by thermal aging testing and subsequent tension testing to measure thermal aging properties.

Thermal Aging Test

Produced electric cable samples from which is removed its core are heated in 150° C./96 h conditions in a thermostat bath, and left unattended at room temperature for substantially 12 hours. This is followed by tension testing. The heat treatment conforms to JISC3005.

Thermal Aging Properties

The samples produced by the thermal aging testing are measured at a pulling velocity of 200 mm/min. The tension testing conforms to JISC3005. A tensile elongation of not less than 200% is denoted by "Good," and a tensile elongation of less than 200% is denoted by "Poor."

Insulation Resistance Measurement

Produced electric cables are immersed in 90° C. water. After the insulator temperature is constant, the insulation resistance is measured, conforming to JISC3005. An insulation resistance of not less than 1.0 MΩ·km is denoted by "Good," and an insulation resistance of less than 1.0 MΩ·km is denoted by "Poor."

Abrasion Test

Figure 2:
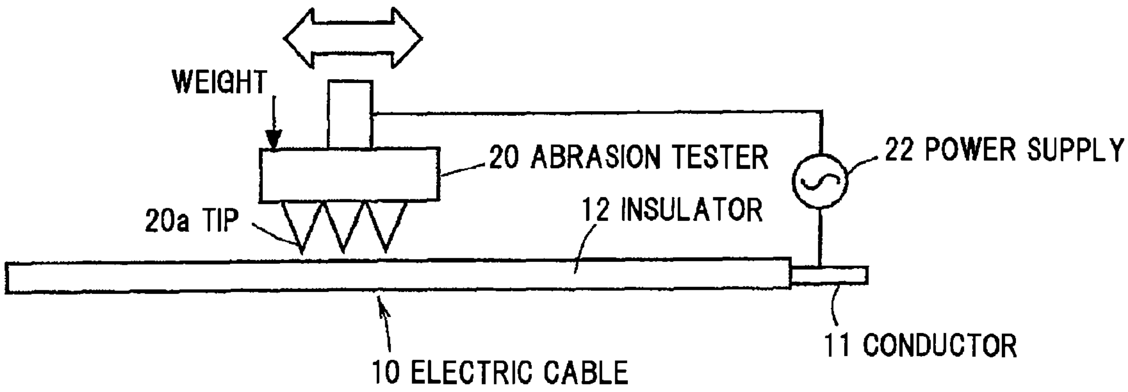
FIG. 2 is a diagram showing an electric cable abrasion tester according to the invention.

In a normal-temperature atmosphere, produced electric cables each are applied with a load of 2 pounds (907 g) by abrasion tester 20 as shown in FIG. 2. With tip 20*a* of the abrasion tester 20 contacted with insulator 12 of electric cable 10, and with power supply 22 applied to between conductor 11 of the electric cable 10 and the tip 20*a*, the abrasion tester 20 is reciprocated, and its reciprocation number until the tip 20*a* is contacted with the conductor 11 to cause a short circuit is measured.

A reciprocation number of not less than 100 is denoted by "Good," and a reciprocation number of less than 100 is denoted by "Poor."

From Table 1, Comparative example 1 is added with no polyester block copolymer (B) and Comparative example 2 contains not more than 40 parts by wt of polyester block copolymer (B), therefore Comparative examples 1 and 2 achieving less than the target values for the elongation after heat treatment and the flame retardancy. Also, Comparative examples 1 and 2 are added with no hydrolysis retarder (C) and calcined clay (D), therefore achieving no target values for the hydrolysis resistance and the insulation resistance.

Comparative example 3 contains as much as 10 parts by wt of hydrolysis retarder (C), therefore rendering the electric cable surface uneven. This sample is unworthy of evaluation.

Comparative example 4 contains less polyester block copolymer (B) and hydrolysis retarder (C) added, therefore making the elongation after heat treatment, flame retardancy and hydrolysis resistance poor. Likewise, Comparative example 5 contains less polyester block copolymer (B) than the range of the invention, therefore achieving no target values for the elongation after heat treatment and the flame retardancy.

Also, Comparative example 6 contains more polyester block copolymer (B) than the range (40-150 parts by wt) of the invention, therefore achieving the target value for the elongation after heat treatment, but damaging the abrasion property. Comparative example 7 contains even more polyester block copolymer (B), therefore making the elongation after heat treatment and the flame retardancy good, but achieving no target value for the abrasion property. Comparative example 7 is added with no hydrolysis retarder (C) and calcined clay (D), therefore making the hydrolysis resistance and the insulation resistance poor.

On the other hand, Examples 1-5 are within the range of the invention, therefore making all the properties good.

Although the Examples have been explained of the insulated electric cable structure whose central conductor is covered with the insulating layer therearound, the resin composition of the invention is not limited to this structure, but may be used as a cable sheath material, i.e., a sheath (jacket) to cover a bundle of these insulated electric cables gathered.

Also, although the Examples with the central conductor formed of a single wire have been explained, the central conductor is not limited thereto, but may be formed by twisting plural single wires into a stranded wire structure, or simply gathering plural single wires.

Also, although the Examples use a soft copper wire as the central conductor material, the central conductor material is not limited thereto, but may be a hard copper wire or a copper alloy wire (e.g., Cu—Sn alloy wire, Cu—Ag alloy wire, Cu—Sn—In alloy wire).

Also, although the Examples use tin as the plating material of the central conductor, the plating material is not limited thereto, but may use a Pb—Sn alloy, Sn—Ag—Cu alloy, Sn—Ag—Cu—P alloy, Sn—Cu—P alloy, Sn—Cu alloy, Sn—Bi alloy, or the like.

Although the invention has been described with respect to the above embodiments, the above embodiments are not intended to limit the appended claims. Also, it should be noted that not all the combinations of the features described in the above embodiments are essential to the means for solving the problems of the invention.

What is claimed is:

1. A polybutylene naphthalate-based resin composition, comprising:

relative to (A) 100 parts by wt of polybutylene naphthalate resin, (B) 40-150 parts by wt of polyester block copolymer;

(C) 0.5-5 parts by wt of hydrolysis retarder; and (D) 0.5-5 parts by wt of inorganic multiporous filler, wherein the inorganic multiporous filler comprises a calcined clay.

2. The polybutylene naphthalate-based resin composition according to claim 1, wherein the polyester block copolymer comprises 20-70 mass % of hard segment containing not less than 60 mol % of polybutylene terephthalate, and 80-30 mass % of soft segment formed of a polyester containing 99-90 mol % of aromatic dicarboxylic acid, 1-10 mol % of carbon number 6-12 straight chain aliphatic dicarboxylic acid, and a carbon number 6-12 straight chain diol, and the melting point (T) of the polyester block copolymer is in the following range:

$$TO-5>T>TO-60,$$

where TO is the melting point of a polymer comprising components constituting the hard segment.

3. The polybutylene naphthalate-based resin composition according to claim 1, wherein the hydrolysis retarder is an additive comprising a carbodiimide skeleton.

4. An electric cable using a polybutylene naphthalate-based resin composition, comprising:

the polybutylene naphthalate-based resin composition used as an insulating material, the polybutylene naphthalate-based resin composition comprising:

relative to (A) 100 parts by wt of polybutylene naphthalate resin, (B) 40-150 parts by wt of polyester block copolymer;

(C) 0.5-5 parts by wt of hydrolysis retarder; and (D) 0.5-5 parts by wt of inorganic multiporous filler, wherein the inorganic multiporous filler comprises a calcined clay.

5. The electric cable according to claim 4, wherein the polyester block copolymer comprises 20-70 mass % of hard segment containing not less than 60 mol % of polybutylene terephthalate, and 80-30 mass % of soft segment formed of a polyester containing 99-90 mol % of aromatic dicarboxylic acid, 1-10 mol % of carbon number 6-12 straight chain aliphatic dicarboxylic acid, and a carbon number 6-12 straight chain diol, and the melting point (T) of the polyester block copolymer is in the following range:

$$TO-5>T>TO-60,$$

where TO is the melting point of a polymer comprising components constituting the hard segment.

6. The electric cable according to claim 4, wherein the hydrolysis retarder is an additive comprising a carbodiimide skeleton.

7. The electric cable according to claim 4, wherein the insulating material formed of the polybutylene naphthalate-based resin composition is 0.1-0.5 mm thick.

* * * * *